(12) United States Patent
Krishna et al.

(10) Patent No.: US 11,954,074 B2
(45) Date of Patent: Apr. 9, 2024

(54) METHOD AND APPARATUS FOR EFFICIENT FILE/FOLDER SYNCHRONIZATION

(71) Applicant: MICRO FOCUS LLC, Santa Clara, CA (US)

(72) Inventors: Vamsi Krishna, Bangalore (IN); Keshavan Santhanam, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/732,060

(22) Filed: Apr. 28, 2022

(65) Prior Publication Data

US 2023/0350853 A1 Nov. 2, 2023

(51) Int. Cl.
*G06F 16/178* (2019.01)
*H04L 9/00* (2022.01)

(52) U.S. Cl.
CPC ............. *G06F 16/178* (2019.01); *H04L 9/50* (2022.05)

(58) Field of Classification Search
CPC ................................. G06F 16/178; H04L 9/50
USPC ........................................................ 707/610
See application file for complete search history.

(56) References Cited

U.S. PATENT DOCUMENTS

| | | | |
|---|---|---|---|
| 7,734,826 B2 | 6/2010 | Brown | |
| 8,463,871 B1 | 6/2013 | Tormasov | |
| 11,316,921 B2 * | 4/2022 | Zeng | H04L 47/2416 |
| 2008/0071867 A1 * | 3/2008 | Pearson | G06Q 10/107 709/206 |
| 2017/0124170 A1 * | 5/2017 | Koorapati | G06F 16/27 |
| 2020/0167367 A1 * | 5/2020 | Zhuo | G06F 16/2246 |
| 2020/0204353 A1 * | 6/2020 | Wang | H04L 65/40 |
| 2020/0279262 A1 * | 9/2020 | Wang | G06Q 40/02 |
| 2020/0304505 A1 * | 9/2020 | Shen | G06F 16/27 |
| 2020/0389291 A1 * | 12/2020 | Xiao | H04L 67/1095 |
| 2021/0135867 A1 * | 5/2021 | Zeng | H04L 63/12 |
| 2021/0151203 A1 * | 5/2021 | Unagami | H04L 9/3247 |
| 2021/0152365 A1 * | 5/2021 | Nosseir | H04L 9/3239 |
| 2021/0279358 A1 * | 9/2021 | Teel | G06F 16/2255 |
| 2021/0303519 A1 * | 9/2021 | Periyagaram | G06F 16/17 |
| 2021/0303523 A1 * | 9/2021 | Periyagaram | G06F 16/13 |
| 2021/0329070 A1 * | 10/2021 | Zeng | H04L 67/1095 |
| 2022/0019575 A1 * | 1/2022 | Qian | G06F 16/2308 |
| 2022/0253458 A1 * | 8/2022 | Shao | G06F 16/273 |
| 2022/0311608 A1 * | 9/2022 | Felker | H04L 9/14 |
| 2022/0405118 A1 * | 12/2022 | Liu | G06F 9/45508 |

* cited by examiner

*Primary Examiner* — Cam Linh T Nguyen
(74) *Attorney, Agent, or Firm* — Sheridan Ross P.C.

(57) ABSTRACT

A synchronization structure that indicates changes to files that are to be synchronized is created. The synchronization structure is stored as a series of synchronization blocks. A first synchronization message is received from a communication device. The first synchronization message includes a next block number. A second synchronization message is sent to the communication device. The second synchronization message comprises one or more synchronization blocks that are identified based on the next block number. A third synchronization message is received from the communication device. The third synchronization message requests a number of files to be synchronized. The number of files to be synchronized are sent to the communication device.

18 Claims, 6 Drawing Sheets

METHOD AND APPARATUS FOR EFFICIENT FILE/FOLDER SYNCHRONIZATION

FIELD

The disclosure relates generally to file/folder synchronization and particularly to file/folder synchronization of files with a file management system.

BACKGROUND

Replicating contents, such as files and folders from a server to a large number of devices has a variety of problems. For example, the number of messages may become very large when the number of files to be synchronized becomes very large, there may be reliability issues, and/or there may be incompatibility issues. The existing implementations currently do not resolve these problems in an efficient manner.

SUMMARY

These and other needs are addressed by the various embodiments and configurations of the present disclosure. The present disclosure can provide a number of advantages depending on the particular configuration. These and other advantages will be apparent from the disclosure contained herein.

A synchronization structure that indicates changes to files that are to be synchronized is created. The synchronization structure is stored as a series of synchronization blocks. A first synchronization message is received from a communication device. The first synchronization message includes a next block number. A second synchronization message is sent to the communication device. The second synchronization message comprises one or more synchronization blocks that are identified based on the next block number. A third synchronization message is received from the communication device. The third synchronization message requests a number of files to be synchronized. The number of files to be synchronized are sent to the communication device.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
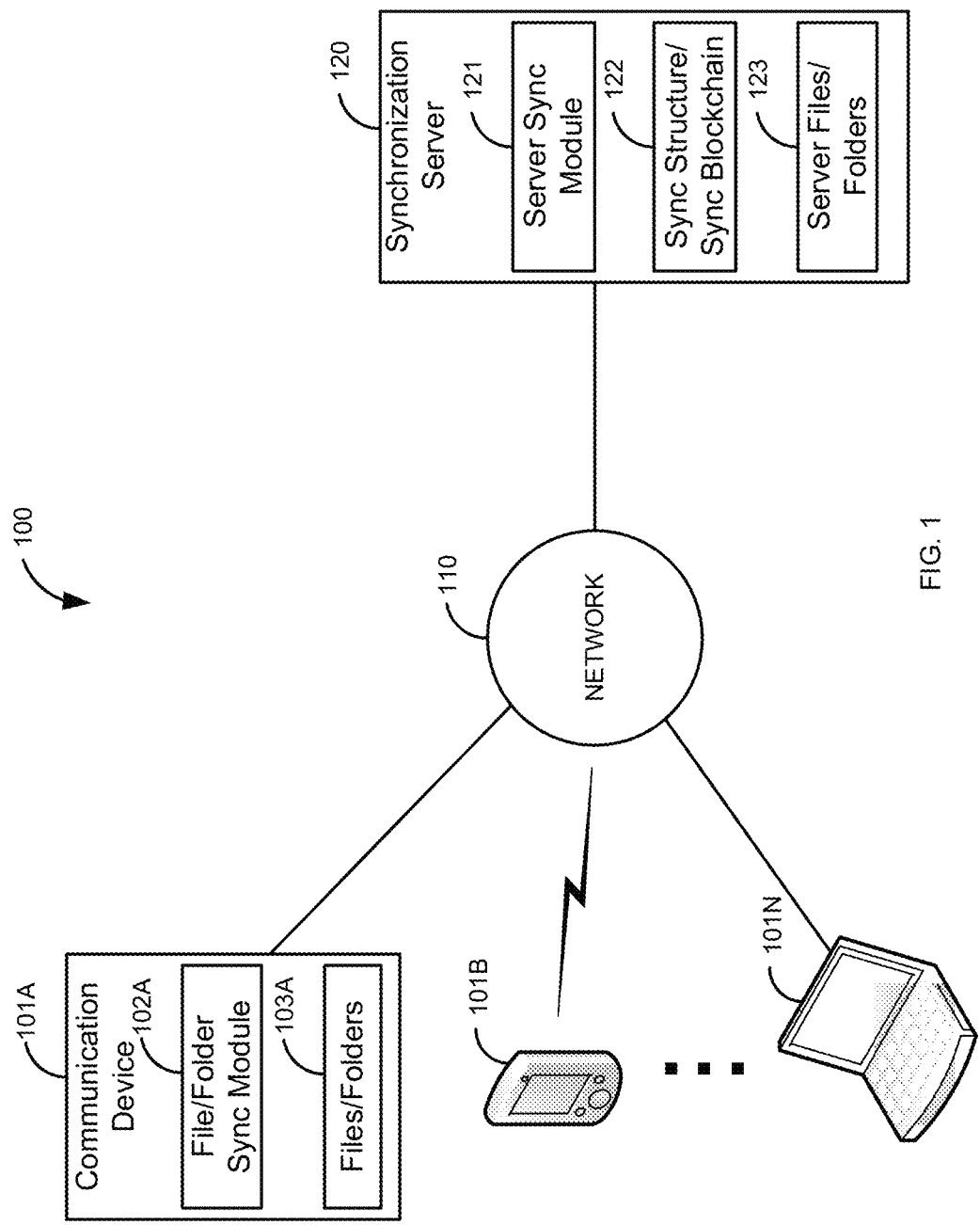
FIG. 1 is a block diagram of a first illustrative system for efficient file/folder synchronization.

FIG. 1 is a block diagram of a first illustrative system 100 for efficient file/folder 103 synchronization. The first illustrative system 100 comprises communication devices 101A-101N, a network 110, and a synchronization server 120. The communication devices 101A-101N can be or may include any device that can communicate on the network 110, such as a Personal Computer (PC), a telephone, a video system, a cellular telephone, a Personal Digital Assistant (PDA), a tablet device, a notebook device, a smartphone, a server, an embedded device/system, a sensor, and the like. As shown in FIG. 1, any number of communication devices 101A-101N may be connected to the network 110, including only a single communication device 101. The communication device 101A comprises a file/folder synchronization module 102A and files/folders 103A. Although the communication devices 101B-101N do not show a file/folder synchronization module 102 and files/folders 103 for convenience, the communication devices 101B-101N may also have a corresponding file/folder synchronization module 102 (i.e., 102B-102N) and files/folders 103 (i.e., 103B-103N).

The file/folder synchronization module 102A can be or may include any hardware coupled with software that can manage synchronization of files/folders 103 from the synchronization server 120 to the communication device 101. The file/folder synchronization module 102 can determine any changes that need to be made to the files/folders 103 as part of a synchronization process with the synchronization server 120.

The files/folders 103A is a structure of files/folders that are stored on the communication device 101A. A directory structure that includes folders is used to synchronize changes/additions/deletions to the files/folders 103A.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The synchronization server 120 can be or may include any hardware coupled with software that is used to manage the synchronization process. The synchronization server 120 can synchronize various types of files/folders 103/123, such as, applications, patches, common updates, security updates, configuration files, malware protection files, and/or the like. The synchronization server 120 comprises a server synchronization module 121, a synchronization structure/synchronization blockchain 122, and server files/folders 123.

The server synchronization module 121 can be or may include any hardware coupled with software that provides synchronization services for the communication devices 101A-101N. The server synchronization module 121 is used to synchronize the server files/folders 123 using the synchronization structure/synchronization blockchain 122.

The synchronization structure/synchronization blockchain 122 may be a data structure that uses different blocks (groups of information) that are used to synchronize the server files/folders 123 with the communication devices 101A-101N. Using a block/blockchain based structure significantly improves the performance of synchronizing changes over existing techniques of synchronizing files. For example, techniques that use database metadata to synchronize requires a larger number of messages and overhead to synchronize files. The data structure of the synchronization structure/synchronization blockchain 122 may be linked together by pointers. In one embodiment, the synchronization structure/synchronization blockchain 122 may be a synchronization blockchain structure that is linked together like described in FIG. 3. The synchronization blockchain structure is used differently from traditional blockchains because the synchronization blockchain structure does not require a distributed ledger (but it could work with a distributed ledger if needed). In other embodiments, the synchronization structure/synchronization blockchain 122 may not be a blockchain like structure (e.g., a database structure) that is not linked together by pointers.

The server files/folders 123 are files/folders that have been designated to be synchronized to one or more of the communication devices 101A-101N. The server files/folders 123 may include any type of file, such as, documents, configuration files, security patches, applications, software updates, backed up files, directory structures, and/or the like. The server files/folders 123 may be synchronized based on rules. For example, the rules may define that only a portion of the communication devices 101A-101N will receive specific server files/folders 123.

Figure 2:
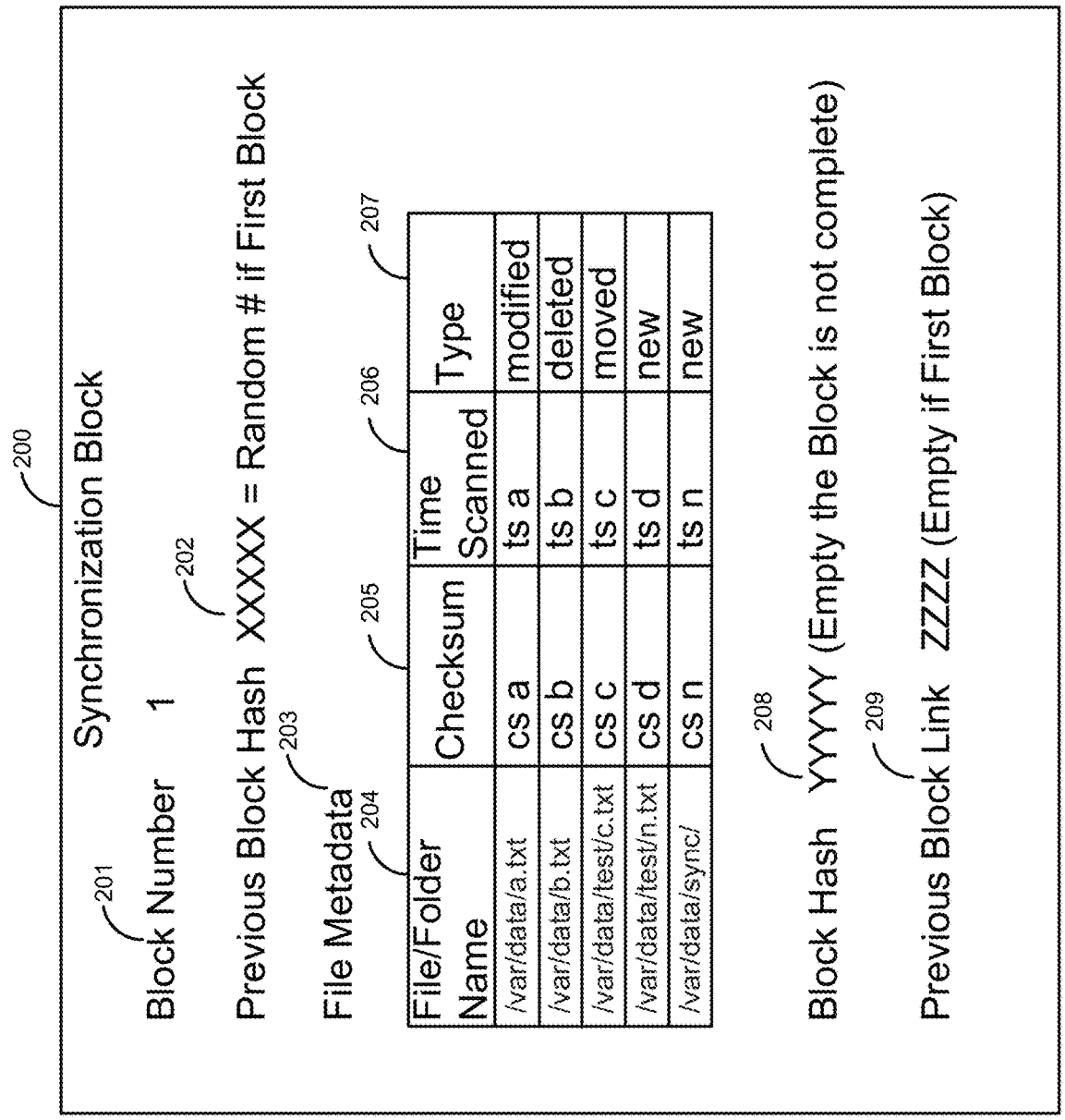
FIG. 2 is a diagram of an exemplary synchronization block that is used to synchronize files/folders.

FIG. 2 is a diagram of an exemplary synchronization block 200 that is used to synchronize the files/folders 103/123. The synchronization block 200 comprises a block number field 201, a previous block hash field 202, file metadata 203, a previous block hash field 208, and a previous block link 209. The block number field 201 indicates the block number. For the first synchronization block 200, the block number typically begins as block number one. However, in some embodiments, the block number may start at zero or some other number.

The previous block hash field 202 has a hash of the previous block. The previous block hash is to provide immutability of the synchronization blocks 200 in a blockchain structure. If the synchronization block 200 is the first block, the previous block hash field 202 may contain a random number. If a genesis block is used the previous block hash field 202 will have a hash of the genesis block. The genesis block is an initial block that is usually started when a new blockchain is created in traditional blockchains.

The file metadata 203 comprises information that is used in conjunction with the file synchronization process. In FIG. 2, the file metadata 203 comprises five records that cover five different files/folders 103/123. The file metadata field 203 comprises a file/folder name field 204, a checksum field 205, a time scanned field 206, and a type field 207. Typically, the file metadata field 203 will be much larger.

The file/folder name field 204 is used to identify server files/folders 123 that have changed during a period that the synchronization block 200 covers. For example, the first record in the file metadata 203 is for the file/var/data/a.txt. The checksum field 205 is a checksum of the file/folder 123. The scanned time field 206 contains information that identifies the last time the file/folder 103/123 was scanned to determine if a modification has been made. The type field 207 indicates how the file/folder 103/12 was changed/modified. A file can be changed/modified in various ways. For example, a file can have new information added, information removed, attributes change (e.g., read, write, execute), be deleted, be moved, be newly created, and/or the like. If a file is moved, the new destination may also be included in the file metadata 203. A folder can be deleted, added, have attributes change, and/or the like.

The block hash field 208 contains a hash of the synchronization block 200. The block hash field 208 also provides immutability of the synchronization block 200. In one embodiment, the synchronization block 200 may be only partially complete. The server synchronization module 121 can complete the synchronization block 200 based on a condition/event, such as, a number of file changes, a time period, a size of the synchronization block 200, and/or the like. In this embodiment, where the synchronization block 200 is not complete, the block hash field 208 would be empty signifying that the synchronization block 200 is not complete. If the synchronization block 200 is not complete, the next time a synchronization occurs, the communication device 101 will indicate that it needs this block to capture any changes since the last synchronization period.

The previous block link 209 is a link to a previous block (if there is one). If there is not a previous block, the previous block link 209 is empty. If the previous block is a genesis block, the previous block link 209 is a link to the genesis block. In one embodiment, there may not be a previous block link 209.

Figure 3:
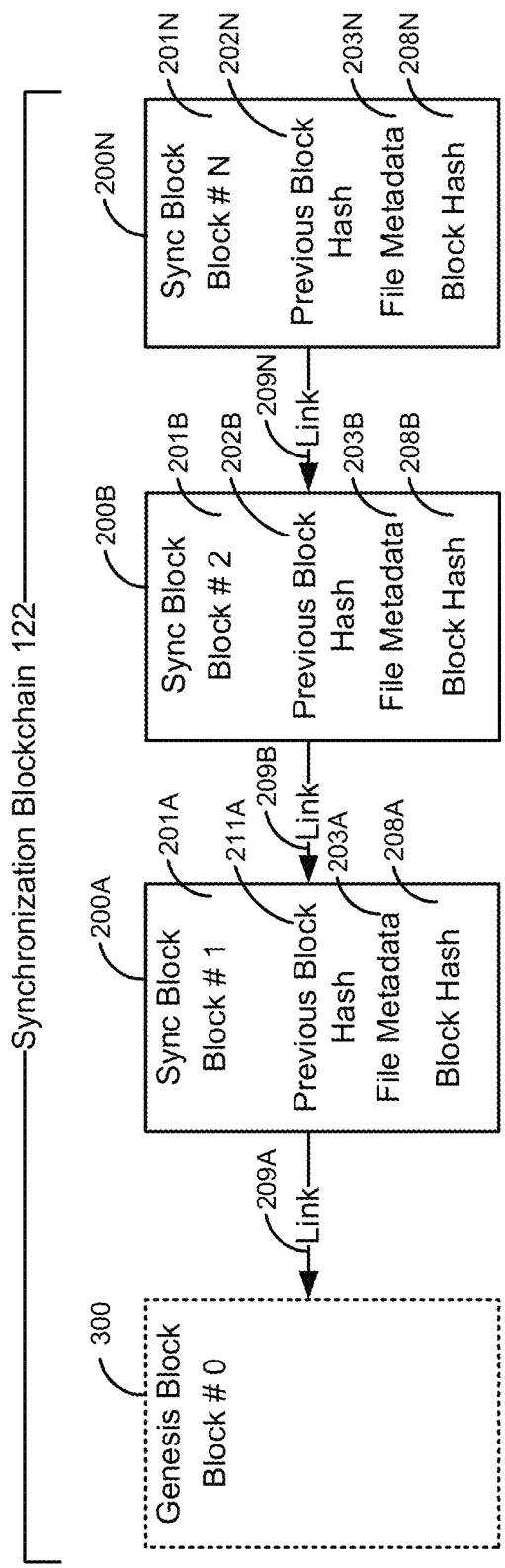
FIG. 3 is diagram of an exemplary synchronization blockchain that is used to synchronize files/folders.

FIG. 3 is diagram of an exemplary synchronization blockchain 122 that is used to synchronize files/folders 103/123. The synchronization blockchain 122 comprises a genesis block 300 and synchronization blocks 200A-200N. The synchronization blocks 200A-200N comprise the block number fields 201A-201N, the previous block hash fields 202A-202N, the file metadata 203A-202N, and the block hash fields 208A-208N. The synchronization block 200N has a previous block link 209N that points to the synchronization block 200B. Likewise, the synchronization block 200B has a previous block link 209B that points to the synchronization block 200A. The synchronization block 200A has a previous block link 209A that points to the genesis block 300. The genesis block 300 is not a synchronization block 200, but is instead a first block in the synchronization blockchain 122. If there is a genesis block 300 in the synchronization blockchain 122, the previous block hash 208A will have a hash of the genesis block 300.

In one embodiment, where the genesis block 300 is not used, the synchronization block 200A will not have a previous block link 209A because the synchronization block 200A is the first block 200A in the synchronization blockchain 122. In this embodiment, the previous block hash 211A will be a random number.

Figure 4:
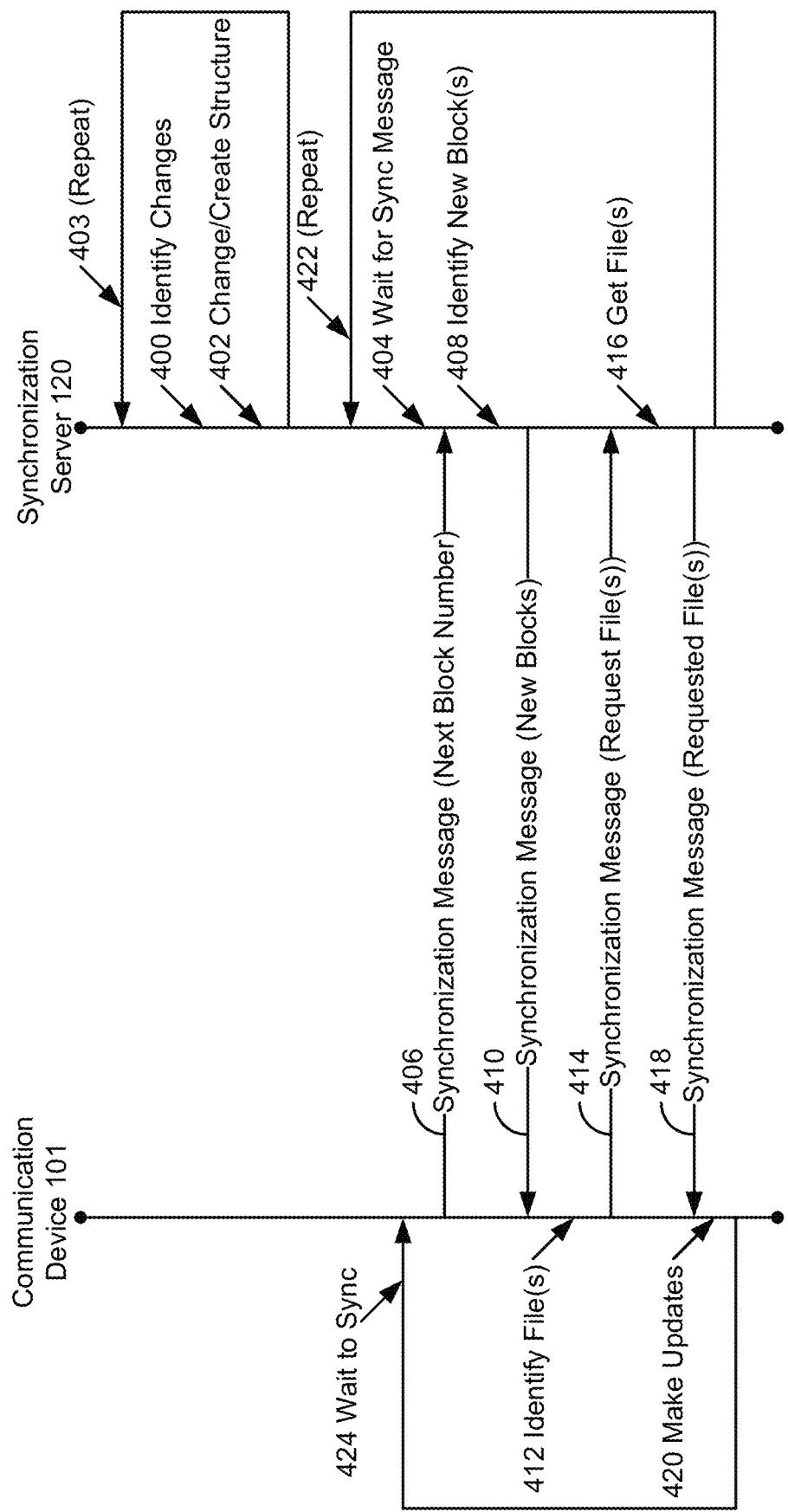
FIG. 4 is a flow diagram of a process for efficient file/folder synchronization.
Figure 5:
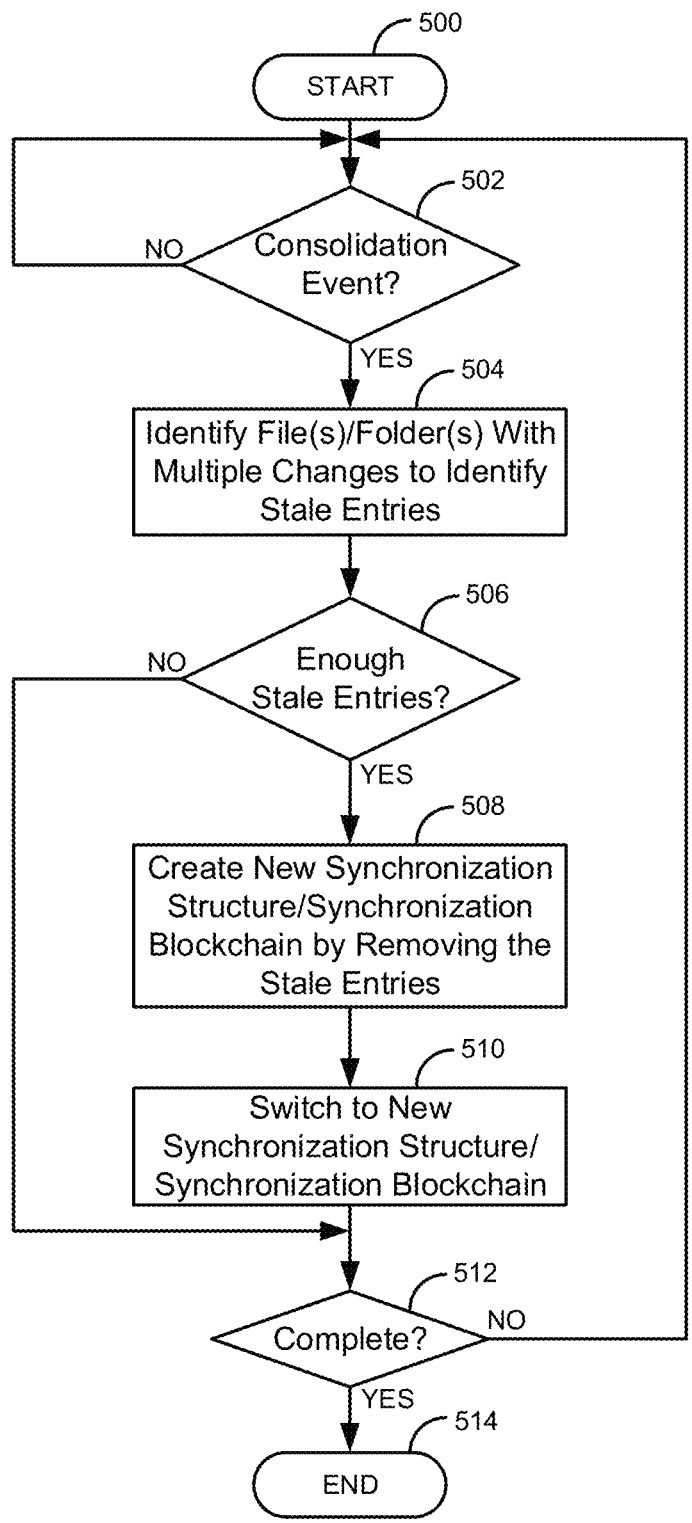
FIG. 5 is a flow diagram of a process for consolidating a synchronization structure/synchronization blockchain used for file/folder synchronization.
Figure 6:
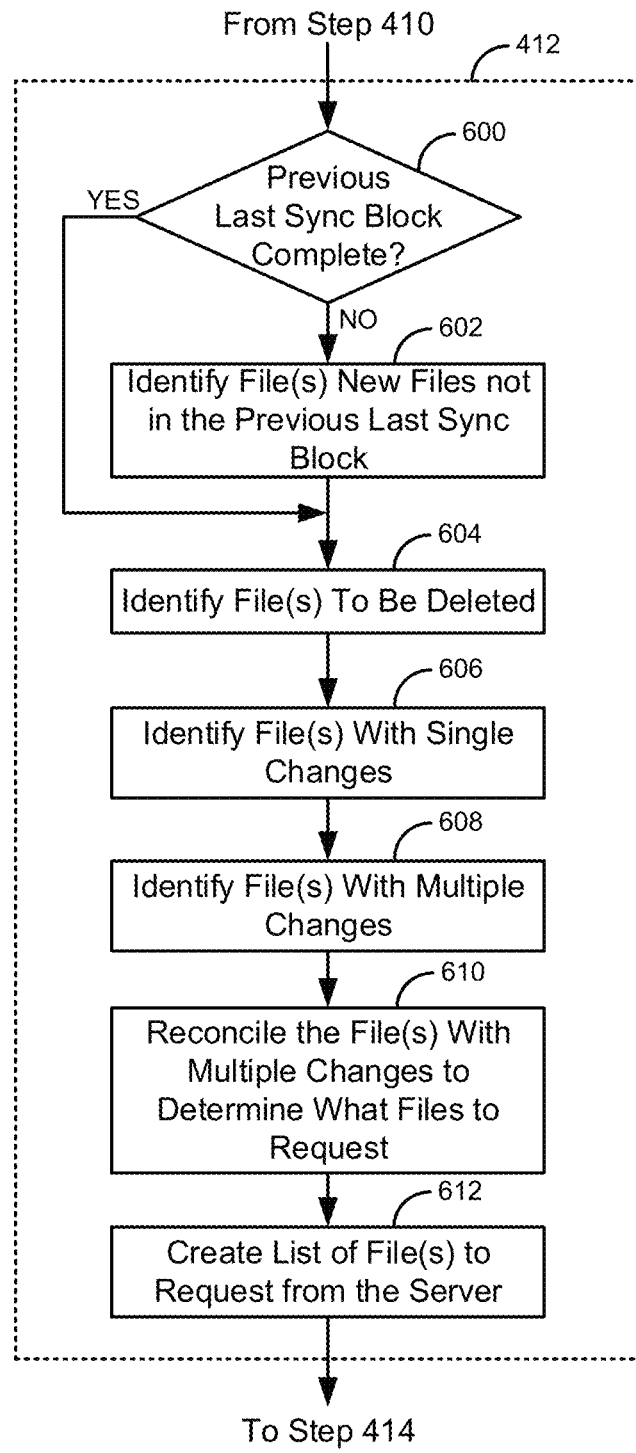
FIG. 6 is a flow diagram of a process for identifying files to request during a synchronization process.

FIG. 4 is a flow diagram of a process for efficient file/folder 103/123 synchronization. Illustratively, the communication devices 101A-101N, the file/folder synchronization modules 102A-102N, the synchronization server 120, the server synchronization module 121, the synchronization structure/synchronization blockchain 122 are stored-program-controlled entities, such as a computer or microprocessor, which performs the method of FIGS. 4-6 and the processes described herein by executing program instructions stored in a computer readable storage medium, such as a memory (i.e., a computer memory, a hard disk, and/or the like). Although the methods described in FIGS. 4-6 are shown in a specific order, one of skill in the art would recognize that the steps in FIGS. 4-6 may be implemented in different orders and/or be implemented in a multi-threaded environment. Moreover, various steps may be omitted or added based on implementation.

The process starts in step 400 where the server synchronization module 121 identifies changes to the server files/folders 123. The changes in the server files/folders 123 may be identified in various ways, such as, based on a file/folder change event, periodically (e.g., every hour), and/or the like. For example, new software patches may now be ready to be downloaded to the communication devices 101A-101N. If it is the first time, the server synchronization module 121 creates the synchronization structure/synchronization blockchain 122 in step 402. If there is an existing synchronization structure/synchronization blockchain 122 in step 402, a new record(s) may be added to the last synchronization block 200. Alternatively, or in addition, a new synchronization block(s) 200 may be added to the synchronization structure/synchronization blockchain 122 in step 402. The process of steps 400/402 then repeat in step 403. For example, steps 400/402 may run in a separate thread that is continually running to continually identify changes in the server files/folders 123.

The server synchronization module 123 waits, in step 404, to receive a synchronization message from the file/folder synchronization module 102. The file/folder synchronization module 102 sends, in step 406, a synchronization message. The synchronization message of step 406 includes a next block number. The next block number is the first block number (e.g., the block number in the block number field 201A) if it is the first time that the communication device 101 synchronizes. Otherwise, the next block number may be the number of the last synchronization block 200 received plus one unless the last synchronization block 200 received was not complete (i.e., the block hash field 208 is empty). If the last synchronization block 200 received was not complete the block number may be the number of the last synchronization block 200 received (the incomplete synchronization block 200).

The server synchronization module 121 receives the synchronization message of step 406. The server synchronization module 121 identifies any new synchronization block(s) 200 to send based on the next block number in step 408. For example, assume that a synchronization blockchain 122 is currently ten blocks long (numbered one through ten) after step 402; if the next block number in the synchronization message of step 406 is eight, the server synchronization module 121 will identify synchronization blocks 200 eight through ten in step 408.

The server synchronization module 121 sends, in step 410, the identified synchronization blocks 200. The file/folder synchronization module 102 receives the identified synchronization blocks 200 in step 410. The file/folder synchronization module 102 identifies files to request in step 412. The identified files are based on the file metadata 203 in each of the synchronization blocks 200 in the synchronization message 410. The identified files of step 412 use a reconciliation process to identify which files have changed. The reconciliation process is described in more detail in FIG. 6.

The file/folder synchronization module 102 sends a synchronization message, in step 414, that requests the file(s) to be synchronized. The server synchronization module 121 receives the synchronization message of step 414. The server synchronization module 121 gets the requested files in step 416. The server synchronization module 121 sends a synchronization message(s) with the requested files in step 418. The file/folder synchronization module 102 receives the synchronization message(s) with the requested files in step 418. The file/folder synchronization module 102 makes the updates to the files/folders 103 in step 420. For example, if a file has been modified, the current file is replaced with the updated file. If a new file is being added, the new file is added. If a file is to be deleted, the file is deleted. The process on the communication device 101 then waits to synchronize in step 424. For example, the file/folder synchronization module 102 may periodically synchronize.

The server synchronization module 121 repeats, in step 422, the synchronization process in on the synchronization server 120 and waits for another synchronization message in step 404. For example, steps 404, 408, and 416 may run on an independent thread that is continually waiting to process synchronization messages.

FIG. 5 is a flow diagram of a process for consolidating a synchronization structure/synchronization blockchain 122 used for file/folder synchronization. Consolidation may be necessary where the server synchronization module 121 determines that there is a significant number of stale entries in the synchronization structure/synchronization blockchain 122. For example, a file may be modified a few times where the changes are recorded in the file metadata 203 in a number of different synchronization blocks 200. In this example, only one modification record is needed in the synchronization blockchain 122. The remaining entries would be considered stale entries. Over time, many stale entries accumulate in the synchronization blockchain 122 as files are modified, moved, deleted, renamed, etc., folders are added, deleted, etc., and/or attributes are changed (e.g., read, write, execute, etc.). This can lead to unnecessary processing as the file metadata 203 is reconciled in the synchronization blocks 200 in the synchronization blockchain 122. A consolidation event may occur periodically. For example, a consolidation event may occur once a month. A consolidation event starts the process of identifying and removing the stale entries in the synchronization structure/synchronization blockchain 122.

The process starts in step 500. The server synchronization module 121 determines, in step 502, if a consolidation event has occurred in step 502. If a consolidation event is not occurred in step 502, the process of step 502 repeats. If a consolidation event has occurred in step 502, the server synchronization module 121 identifies files/folders 123 in the synchronization structure/synchronization blockchain 122 with multiple changes so that any stale entries may be identified in step 504. For example, a folder may be created and then have its attributes change (e.g., from read/write access to read only access). In this case, the creation of the folder would be a stale entry. The two entries would be replaced with a create entry with the read only attributes. Likewise, if there were three different modification events stored in the synchronization structure/synchronization blockchain 122 for a file, the first two entries would be stale entries. The two stale entries would be removed.

The server synchronization module 121 determines, in step 506, if there are enough stale entries. For example, there may be a threshold number of stale entries required. If there are not enough stale entries in step 506, the process goes to step 512. Otherwise, if there are enough stale entries in step 506, the server synchronization module 121 creates a new synchronization structure/synchronization blockchain 122 in step 508, by removing the stale entries. The server synchronization module 121 then switches to the new synchronization structure/synchronization blockchain 122 in step 510.

The creating of the new synchronization structure/synchronization blockchain 122 in step 508 may use a one-to-one correlation. In other words, the same number of synchronization blocks 200 in the current synchronization structure/synchronization blockchain 122 will be the same as the number of synchronization blocks 200 in the new synchronization structure/synchronization blockchain 122. Alternatively, the server synchronization module 121 may consolidate some of the synchronization blocks. For example, if two synchronization blocks 200 in a row are below a threshold for entries, the two synchronization blocks 200 may be consolidated into a single synchronization block 200. Thus, the new synchronization structure/synchronization blockchain 122 will have less synchronization blocks 200 that the current synchronization structure/synchronization blockchain 122.

The server synchronization module 121 determines, in step 512, if the process is complete. If the process is not complete in step 512, the process goes back to step 502. Otherwise, if the process is complete in step 514, the process ends in step 514.

FIG. 6 is a flow diagram of a process for identifying files to request during a synchronization process. The process of FIG. 6 is an exemplary embodiment of step 412 of FIG. 4. After receiving the synchronization message of step 410, the file/folder synchronization module 102 determines, in step 600, if the previous last synchronization block 200 was complete. For example, if the previous last synchronization block 200 was not complete and the first synchronization block 200 in the new synchronization block(s) 200 received in step 410 is the same block, this indicates that there are additional entries in the first synchronization block 200 in the new synchronization block(s) 200 that were received in step 410.

If the previous last synchronization block 200 is complete in step 600, the process goes to step 604. Otherwise, if the previous last synchronization block 200 is not complete in step 600, the file/folder synchronization module 102 identifies, in step 602, any new files that were not in the previous last synchronization block 200. The file/folder synchronization module 102 identifies files to be deleted in step 604. Files to be deleted will not need to be requested in step 414.

The file/folder synchronization module 102 identifies files with single changes in step 606. If there is only a single change, the file will need to be requested. The file/folder synchronization module 102 identifies file(s) with multiple changes in step 608. For example, a file with multiple changes may be a file that was modified more than once, a file that was modified and then deleted, a file that was modified and then renamed, a file that was modified and then moved, a file that was created and then modified, and/or the like. The file/folder synchronization module 102 reconciles the file(s) with the multiple changes to determine what files need to be requested (like identifying stale entries in FIG. 5). The file/folder synchronization module 102 creates a list of one or more files to request from the synchronization server 120 in step 612. The requested files would be the files with single changes (step 606) and the reconciled files of step 610. The process then goes to step 414 where the list of files is sent to the server 120.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that can supply and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

Several variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
create a first synchronization structure that indicates changes to files that are to be synchronized, wherein the first synchronization structure is stored as a series of synchronization blocks, wherein each synchronization block stores a specified number of records or is a predetermined size, wherein each synchronization block includes a block hash field that includes a hash of a block number of each synchronization block and provides immutability, wherein an empty block hash field identifies an uncompleted synchronization block, and wherein a respective synchronization block is incomplete if the respective synchronization block does not contain the specified number of records or is not the predetermined size;
receive a first synchronization message from a communication device, wherein the first synchronization message includes a next block number;
send a second synchronization message to the communication device, wherein the second synchronization message comprises one or more synchronization blocks that are identified based on the next block number;
receive a third synchronization message from the communication device, wherein the third synchronization message requests a number of files to be synchronized; and
send the number of files to be synchronized to the communication device.

2. The system of claim 1, wherein the first synchronization structure is not based on a blockchain structure, and wherein the first synchronization structure does not require a distributed ledger and is linked together by pointers.

3. The system of claim 1, wherein the first synchronization structure is a first synchronization blockchain structure.

4. The system of claim 3, wherein the first synchronization blockchain structure does not have a genesis block, and wherein a first synchronization block in the first synchronization blockchain structure has a random number for a previous block hash.

5. The system of claim 3, wherein the first synchronization blockchain structure has a genesis block.

6. The system of claim 1, wherein the microprocessor readable and executable instructions further cause the microprocessor to:
create a second synchronization structure, wherein the second synchronization structure is a consolidation of the first synchronization structure, wherein the second synchronization structure is consolidated by consolidating a plurality of changes to individual ones of the number of files to be synchronized, and wherein creation of the second synchronization structure is triggered when a number of stale entries exceeds a predetermined threshold; and
in response to creating the second synchronization structure, switch to the second synchronization structure.

7. The system of claim 1, wherein a plurality of changes to individual ones of the number of files to be synchronized are identified by the communication device, and wherein the communication device makes a single change to the individual ones of the number of files based on the plurality of changes.

8. The system of claim 7, wherein the plurality of changes to the individual ones of the number of files are based on at least one of: a file that was modified more than once, a file that was modified and then deleted, a file that was modified and then renamed, a file that was modified and then moved, and a file that was created and then modified.

9. A method comprising:
   creating, by a microprocessor, a first synchronization structure that indicates changes to files that are to be synchronized, wherein the first synchronization structure is stored as a series of synchronization blocks, wherein each synchronization block stores a specified number of records or is a predetermined size, wherein each synchronization block includes a block hash field that includes a hash of a block number of each synchronization block and provides immutability, wherein an empty block hash field indicates an uncompleted synchronization block, and wherein a respective synchronization block is incomplete if the respective synchronization block does not contain the specified number of records or is not the predetermined size;
   receiving, by the microprocessor, a first synchronization message from a communication device, wherein the first synchronization message includes a next block number;
   sending, by the microprocessor, a second synchronization message to the communication device, wherein the second synchronization message comprises one or more synchronization blocks that are identified based on the next block number;
   receiving a third synchronization message from the communication device, wherein the third synchronization message requests a number of files to be synchronized; and
   sending the number of files to be synchronized to the communication device.

10. The method of claim 9, wherein the first synchronization structure is not based on a blockchain structure, and wherein the first synchronization structure does not require a distributed ledger and is linked together by pointers.

11. The method of claim 9, wherein the first synchronization structure is a first synchronization blockchain structure.

12. The method of claim 11, wherein the first synchronization blockchain structure does not have a genesis block, and wherein a first synchronization block in the first synchronization blockchain structure has a random number for a previous block hash.

13. The method of claim 11, wherein the first synchronization blockchain structure has a genesis block.

14. The method of claim 9, further comprising:
   creating a second synchronization structure, wherein the second synchronization structure is a consolidation of the first synchronization structure, and wherein the second synchronization structure is consolidated by consolidating a plurality of changes to individual ones of the number of files to be synchronized; and
   in response to creating the second synchronization structure, switching to the second synchronization structure.

15. The method of claim 9, wherein a plurality of changes to individual ones of the number of files to be synchronized are identified by the communication device and wherein the communication device makes a single change to the individual ones of the number of files based on the plurality of changes.

16. The method of claim 15, wherein the plurality of changes to the individual ones of the number of files are based on at least one of: a file that was modified more than once, a file that was modified and then deleted, a file that was modified and then renamed, a file that was modified and then moved, and a file that was created and then modified.

17. A communication device comprising:
   a microprocessor; and
   a computer readable medium, coupled with the microprocessor and comprising microprocessor readable and executable instructions that, when executed by the microprocessor, cause the microprocessor to:
      send, from the communication device, a first synchronization message, wherein the first synchronization message indicates a next block number of a synchronization block in a first synchronization structure, wherein each synchronization block stores a specified number of records or is a predetermined size, wherein each synchronization block includes a block hash field that includes a hash of a block number of each synchronization block and provides immutability, wherein an empty block hash field identifies an uncompleted synchronization block, and wherein a respective synchronization block is incomplete if the respective synchronization block does not contain the specified number of records or is not the predetermined size;
      receive, by the communication device, a second synchronization message, wherein the second synchronization message comprises one or more identified synchronization blocks, and wherein the one or more identified synchronization blocks are identified based on the next block number;
      identify files in the one or more identified synchronization blocks; and
      based on the files identified in the one or more identified synchronization blocks:
         identify and filter out files to be deleted;
         identify files with a single change and add the files with a single change to a list of files to request;
         identify files with multiple changes, reconcile the files with multiple changes, and add the files with multiple changes to the list of files to request;
         send a third synchronization message from the communication device, wherein the third synchronization message comprises the list of files to request; and
         receive a fourth synchronization message, wherein the fourth synchronization message comprises files from the list of files to request.

18. The communication device of claim 17, wherein the next block number identifies a previously uncompleted synchronization block that is now complete and wherein the microprocessor readable and executable instructions further cause the microprocessor to:
   identify new files in the previously uncompleted synchronization block that are now complete, wherein the new files are add to the list of files to request.

* * * * *